July 12, 1966 J. H. DUFF ET AL 3,260,366
FILTER
Filed Oct. 30, 1963 2 Sheets-Sheet 1

INVENTORS.
JOSEPH H. DUFF
ALFONSE J. SORIENTE
BY Byron, Hume, Groen & Clement
Attorneys.

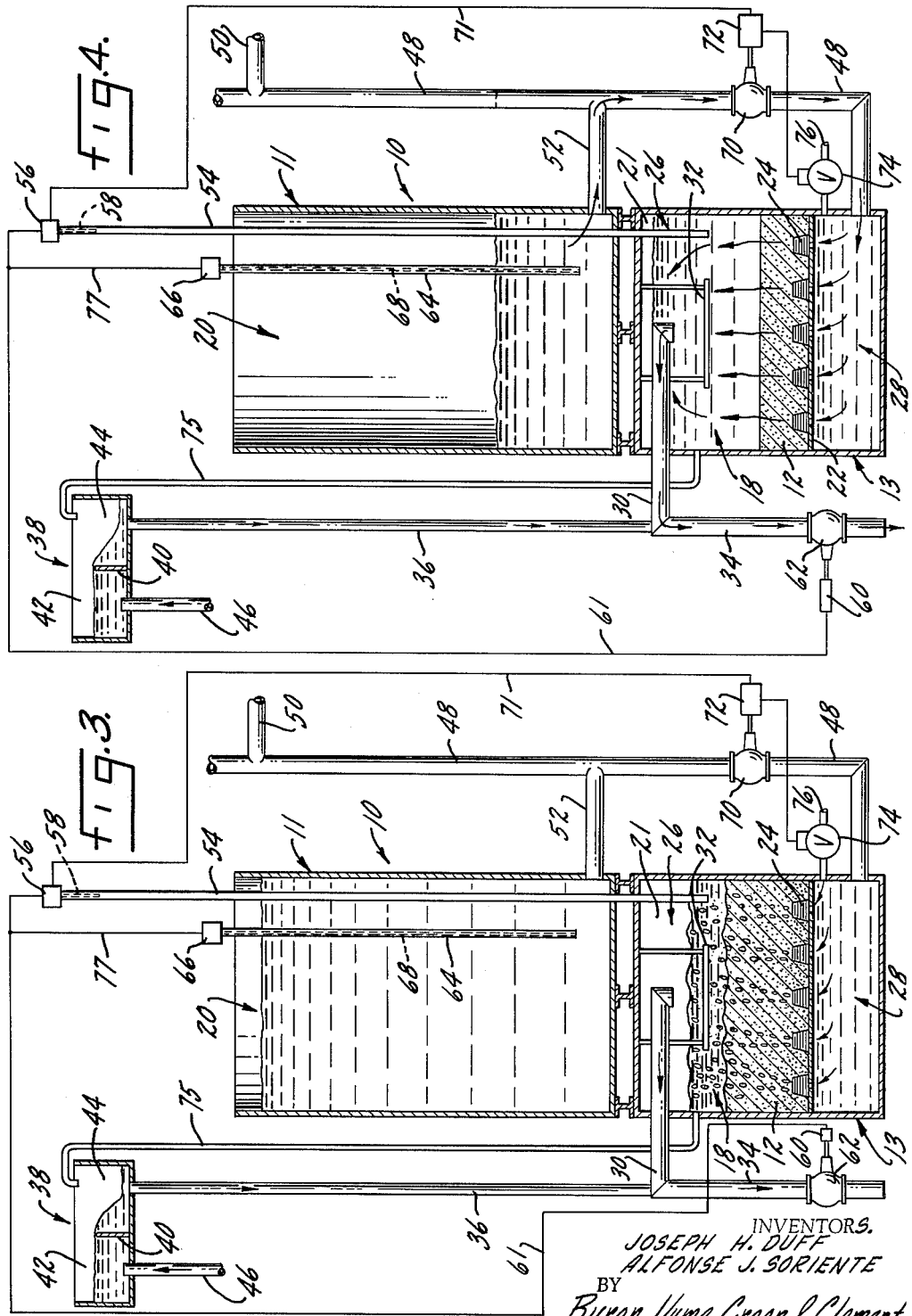

United States Patent Office 3,260,366
Patented July 12, 1966

3,260,366
FILTER
Joseph H. Duff, Basking Ridge, and Alfonse J. Soriente, Gillette, N.J., assignors to Union Tank Car Company, Chicago, Ill., a corporation of New Jersey
Filed Oct. 30, 1963, Ser. No. 320,149
14 Claims. (Cl. 210—80)

This invention relates to a method and apparatus for filtering liquids with a filter bed and, more particularly, to a method and apparatus for cleaning a filter bed which has been used to filter a liquid.

A typical method of filtering a liquid is to pass the untreated or raw liquid through a filter chamber having a filter bed of suitable filter media, such as sand or other granular material well known in the art. The untreated liquid is passed into the inlet side of the filter chamber and as the liquid passes through the filter bed suspended matter in the liquid is removed. The filtered or treated liquid passes to the outlet side of the filter chamber through a suitable false bottom in the filter chamber to an underdrain compartment. The false bottom is designed to retain the filter bed but allow the filtered liquid to pass therethrough to the underdrain compartment. The filtered liquid passes from the underdrain compartment to the service line through suitable conduits.

After a period of time the filter bed becomes clogged and fouled with solid, foreign material removed from the untreated liquid during filtration and, accordingly, becomes less efficient. As the filter bed becomes clogged, the pressure differential between the upstream side and the downstream side of the filter bed increases. Thus, the head loss or increased pressure drop across the filter bed can be used as a means to determine when the filter bed should be cleaned.

One method of cleaning the filter bed is to backwash the bed with filtered liquid. This step involves introducing a reverse flow of filtered liquid through the filter bed to carry the foreign matter in the filter bed to waste. Some materials filtered from the raw liquid are sticky in nature and tend to adhere to the filter media and simple backwashing is not sufficiently effective to clean the bed after the filtering cycle. This has been recognized in the art for many years. To overcome these deficiencies, a gas cleaning or scouring cycle has heretofore been utilized before the backwashing cycle. In such a gas cleaning or scouring cycle, air or other suitable gas under pressure is introduced into the underdrain compartment of the filter chamber and passed upwardly through the filter bed. As the air passes through the filter bed, it violently agitates the filter media and thereby dislodges foreign material in the filter bed and foreign material on the filter media. The backwash liquid then removes the foreign material from the filter chamber.

One of the problems, however, in utilizing a gas scouring cycle is that the gas, by virtue of the velocity with which it passes through the filter bed to agitate the filter media, carries filter media with it as it leaves the filter chamber. Thus, there is occasioned a great loss of filter media during the gas scouring cycle. In an effort to aviod the loss of filter media, it has heretofore been the practice to drain water from the filter chamber prior to the gas scouring cycle. In this manner an air chamber above the filter bed is provided wherein the filter media carried with the scouring gas will disengage from the gas and fall back to the filter bed. Hence, the filter media will not be carried out of the filter chamber with the scouring gas. However, to drain water from the filter chamber, whether it is done by manual or automatic means, requires additional valving and the operator's attention. Accordingly, filters utilizing this known technique are complicated in design and expensive to operate.

It is, therefore, desirable to provide a method and apparatus for filtering a liquid wherein gas scouring and backwashing of the filter bed may be achieved without draining the filter chamber prior to the gas scouring cycle.

Accordingly, it is an object of the present invention to provide a method and apparatus for filtering a liquid with a filter bed mounted in a filter chamber wherein the filter bed is cleaned by gas scouring and backwashing without draining the filter chamber prior to the gas scouring cycle.

It is a further object of the present invention to provide a method and apparatus for filtering a liquid containing solid impurities.

It is a further object of the present invention to provide a filtering apparatus having a filter bed in a filter chamber wherein gas scouring and backwashing of the filter bed may be effected without draining the filter chamber.

The invention, both as to its organization and method of operation, taken with further objects and advantages thereof, will be understood by reference to the following description taken in conjunction with the accompanying drawings, in which:

FIGURE 3 is a side elevational view, partially in section, illustrating the filter of FIGURE 1 during the gas scouring cycle; and FIGURE 4 is a side elevational view, partially in section, illustrating the filter of FIGURE 1 during the backwash cycle.

Figures 1, 2:
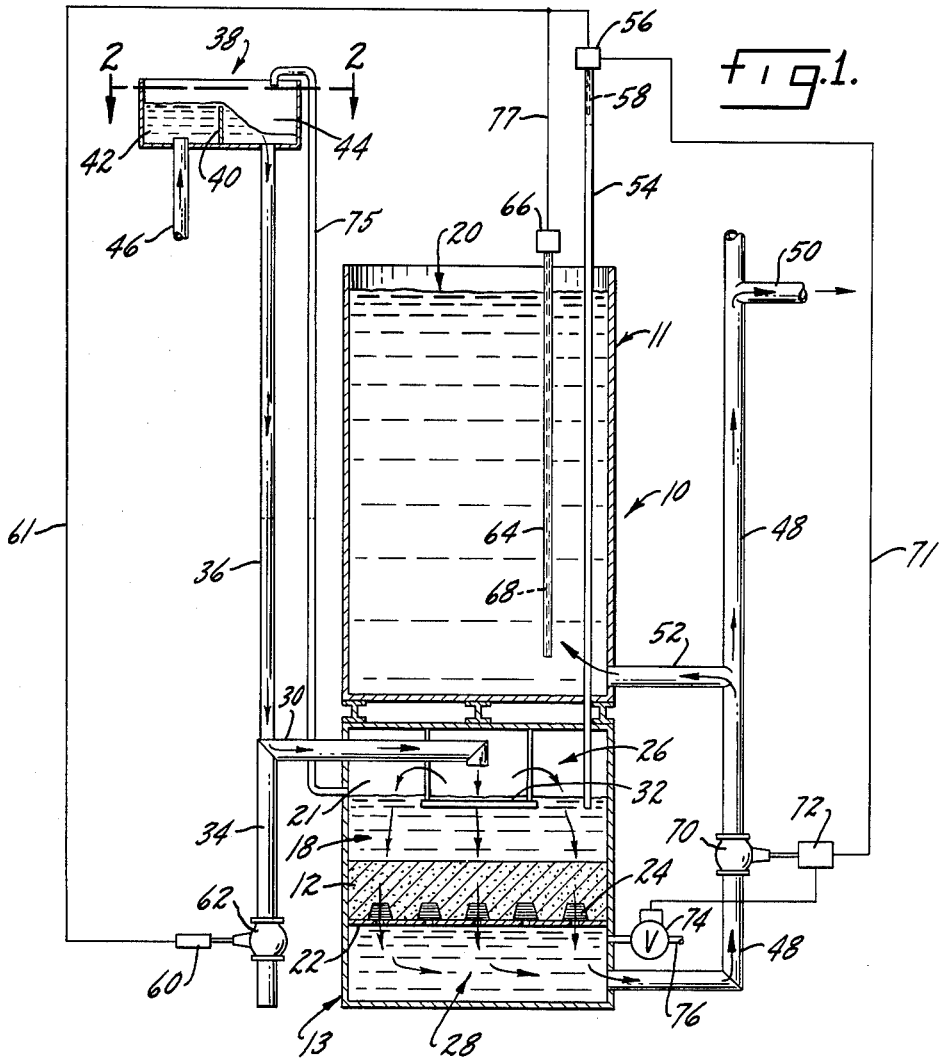
FIGURE 1 is a side elevational view, partially in section, illustrating a filter embodying the features of the present invention, the filter being illustrated during the filtering or service cycle.
FIGURE 2 is a cross-sectional view of the filter of FIGURE 1 taken along line 2—2 of FIGURE 1.

Referring now to the drawings, and more particularly to FIGURES 1 and 2, there is illustrated a filter embodying the features of the present invention and indicated generally by reference numeral 10. The filter 10 has a filter bed 12 of filter media through which the raw liquid is passed, during the service or filtering cycle, to remove solid foreign materials therefrom. Filtered or treated water from the filter 10 is passed to service. After the filter bed 12 has become clogged with foreign particles removed from the raw liquid, a gas scouring cycle is automatically initiated wherein air is passed upwardly through the filter bed 12 to disoldge foreign matter in the filter bed 12 and on the filter media. After the filter bed 12 has been gas scoured, the filter bed 12 is backwashed with treated liquid to remove the foreign material from the filter bed 12. The filter 10 is then ready to begin the filtering cycle again. In accordance with the present invention, there is no loss of filter media during the gas scouring cycle. This is in contrast to heretofore employed methods and apparatus wherein gas scouring resulted in the loss of filter media.

More specifically, the filter 10 comprises an upper, open cylindrical tank 11 mounted by suitable means upon a lower, closed cylindrical tank 13. The tank 11 forms a backwash storage chamber 20 while the tank 13 forms a filter chamber 18. The filter bed 12 of suitable filter media, such as sand or the like, is situated in the filter chamber 18 on a false bottom member 22 with strainer means 24, as is well known in the art. In this manner, an inlet compartment 26 and an underdrain compartment 28 are formed above and below, respectively, the filter bed 12 in the filter chamber 18.

A transfer conduit 30 extends into and communicates with the inlet chamber 26 to carry raw liquid into the filter chamber 18. As will be more apparent hereinafter, the transfer conduit 30 is also utilized to remove backwash liquid and scouring gas from the filter chamber 18 and the inlet chamber 26. Within the inlet chamber 26 there is mounted a baffle 32 which functions to distribute incoming raw liquid from the transfer conduit 30 unevenly across the filter bed 12. Thus, during the service cycle, raw liquid from the transfer conduit 30 flows past the baffle 32 into the filter chamber 18 and through the filter bed 12 and the strainers 24 into the underdrain compartment 28. The insoluble materials suspended in the raw liquid are thereby extracted and retained in the filter bed 12.

An inlet pipe 36 is connected to the transfer conduit 30 and extends upwardly to a height above the backwash storage chamber 20. The inlet pipe 36 is connected to an overflow weir-type inlet head box 38. The inlet head box 38 is a rectangular tank having a weir or partition 40 dividing the tank into compartments 42 and 44. A pipe 46 for raw liquid communicates with the compartment 42 and transfers the raw liquid into the compartment 42. The raw liquid overflows the weir 40 into the chamber 44 and the inlet pipe 36. As the raw liquid overflows or cascades over the weir 40, air is entrained in the raw liquid. In accordance with the present invention, the raw liquid passing to the inlet chamber 26 must have entrained gas therein as will be explained in more detail hereinafter. The inlet head box 38 is one means by which air may be entrained in the raw water. Many other gas entraining means may be employed without departing from the present invention, as will be understood by one with ordinary skill in the art. For example, a pump with a snifter valve may be employed to pump the raw liquid to the inlet pipe 36. Such a pump will entrain air in the raw liquid feed. Furthermore, if an air bleed line is placed on the inlet pipe 36 or the transfer conduit 30 or an eductor on the inlet pipe 36 to suck atmospheric air into the inlet pipe 36, the raw liquid entering the filter chamber 18 will have entrained air. If the filter is to be operated under pressure, air may be forced into the raw liquid by a compressor or the like prior to the liquid entering the inlet chamber 26. These are merely exemplary means by which a gas, such as air, may be entrained in the raw liquid prior to its entering the inlet chamber 26 of the filter chamber 18 in accordance with the present invention.

The raw liquid, therefore, passes from a suitable source through the line 46 into the chamber 42 of the inlet head box 38, overflows the weir 40 and passes through the chamber 44, the inlet pipe 36 and the transfer conduit 30 to the inlet chamber 26. The raw liquid passes through the filter bed 12 and the treated water is recovered in the underdrain compartment 28. The treated water passes from the underdrain compartment to a service outlet riser pipe 48 which communicates with a service outlet pipe 50 at a level near the top of the backwash storage chamber 20. The service outlet riser pipe 48 communicates with the bottom of the backwash storage chamber 20 through a by-pass pipe 52. The filtered liquid passes from the riser pipe 48 through the by-pass pipe 52 into the backwash storage chamber 20. Simultaneously, the filtered liquid rises in the service outlet riser pipe 48. The backwash storage chamber 20 fills until the filtered liquid reaches a level substantially equal to that of the service outlet pipe 50, after which time all of the treated liquid passes through the service pipe 50. The liquid which has been separated in the backwash storage chamber 20 is used to clean the filter bed 12 during the backwash cycle.

A high level control pipe 54 communicates with the inlet chamber 26 of the filter chamber 18. The control pipe 54 is a vertically extending pipe extending through the backwash storage chamber 20 or, as shown in the drawings, positioned outside the filter apparatus 10. At its upper end, which extends above the high liquid level in the backwash storage chamber 20, the high level control pipe 54 has a high level sensing switch 56 with a probe 58. This switch 56 is actuated when liquid, rising in the high level pipe 54, contacts the probe 58. The point at which the high level control switch 56 is actuated represents a predetermined pressure drop across the filter bed 12.

The high level control switch 56 is electrically connected with an electrical actuating means 60, as indicated diagrammatically by line 61. The electrical actuating means 60 is in turn connected to and mechanically controls the opening and closing of a butterfly valve 62 or the like positioned in a backwash line 34 connected to the inlet pipe 36 and the transfer conduit 30. The high level control switch 56 is also electrically connected with a timer-valve control mechanism 72 as indicated diagrammatically by line 71. The timer-valve control mechanism 72 controls the opening and closing of valves 70 and 74. The valve 70 is in the riser pipe 48 and may be a butterfly valve or other suitable valve as will be understood by one with ordinary skill in the art. The valve 74 is in an air line 76 which communicates with the underdrain chamber 28 of the filter chamber 18.

When the high level sensing switch 56 is actuated, an electrical impulse is transferred to the electrical actuating means 60 and the timer-control valve mechanism 72. This causes the electrical actuating means 60 to open the valve 62 rapidly. Simultaneously, the timer-control valve mechanism 72 causes the valve 70 to close slowly and the valve 74 to open slowly. After the valve 70 has closed and the valve 74 opened, the filter 10 goes through the gas scouring cycle (FIGURE 3) wherein air from the line 76 passes upwardly through the filter bed 12 to dislodge foreign material therein. The air passes out of the filter chamber 18 through the transfer conduit 30 and a vent tube 75 as will be explained more fully hereinafter. After a predetermined period of time, the timer-control valve mechanism 72 automatically causes the valve 74 to close and the valve 70 to open. This initiates the backwash cycle.

During the backwash cycle (FIGURE 4), the filtered liquid which has been stored in the backwash storage compartment 20 will flow through the by-pass pipe 52, the valve 70 and the riser pipe 48 into the underdrain compartment 28 of the filter chamber 18. The backwash liquid flows upwardly through the filter bed 12 and passes through the transfer conduit 30 to the inlet pipe 36 and out to drain through the backwash pipe 34 and the valve 62. The backwash liquid carries the foreign matter from the filter bed 12 with it.

A low level control pipe 64 extends downwardly into the backwash storage chamber 20 and has its bottom outlet communicating with the lower portion of the backwash storage chamber 20. A low level sensing switch 66 is attached to the top of the low level control pipe 64 and has a probe 68 which extends downwardly to the outlet of the pipe 64. The low level sensing switch 66 is excited or actuated when liquid in the backwash storage chamber 20 drops to a level lower than the end of the probe 68. The low level sensing switch 66 is also electrically connected with the electrical actuating means 60 as indicated diagrammatically by a line 77 connected to the line 61. When the low level sensing switch 66 is actuated, an electrical impulse is transferred to the electrical actuating means 60. This actuates the electrical actuating means 60 to close the valve 62. In this manner, when the level of filtered liquid in the backwash storage chamber 20 has dropped to a level below the end of the probe 68, the valve 62 is closed and the service cycle of the filtering apparatus 10 begins again.

Considering the operation of the filtering apparatus 10 in more detail, during the filtering or service cycle of the filtering apparatus 10 the valve 62 is closed. In this manner, as shown in FIGURE 1, the raw liquid with entrained air passes through the inlet pipe 36 and the transfer conduit 30 into the inlet chamber 26 of the filter chamber 18. The raw liquid passes through the filter bed 12 and into the underdrain compartment 28 from which it flows upwardly through the riser pipe 48. The control valve 70 is open so that the filtered liquid flows up the riser pipe 48. The backwash storage chamber 20 fills with filtered liquid until it has reached the level of the service outlet pipe 50 and thereafter the filtered liquid flows out the service outlet pipe 50.

The entrained air in the raw liquid is released from the raw liquid in the inlet chamber 26 of the filter chamber 18. This released air accumulates and causes a void space 21 in the inlet chamber 26, as shown in FIGURE 1. This void space 21 is essential to the present invention. The amount of air that is permitted to accumulate, i.e. the size of the void space 21, is controlled by the vent pipe 75 which communicates with the inlet chamber 26 at substantially the level it is desired to maintain the liquid in the inlet chamber 26. Excess air accumulating in the inlet chamber 26 is withdrawn through the vent pipe 75.

During the service cycle, the collection of foreign material in the filter bed 12 will increase the pressure drop across the filter bed 12 and thus create a pressure differential between the inlet chamber 26 and the underdrain compartment 28. This pressure differential will be represented by a rise of the liquid in the high level sensing pipe 54. When the pressure drop across the filter media of the filter bed 12 reaches a predetermined amount, the liquid in the high level sensing pipe 54 will have risen to a point where it contacts the probe 58. This actuates the switch 56, and accordingly the actuating means 60 and timer-control valve mechanism 72, causing the valve 62 to open rapidly, the valve 70 to close slowly and the valve 74 to open slowly. With the valves 62 and 70 open, backwash or filtered liquid in the backwash storage chamber 20 flows through the by-pass pipe 52 and the riser pipe 48 into filter chamber 18. This flow of backwash liquid will continue until the valve 70 closes. The closing of the valve 70 is timed so that sufficient backwash liquid flows into the filter chamber 18 to at least fluidize the bottom of the filter bed 12. Slight fluidization of the filter bed 12 makes the subsequent gas scouring cycle more effective.

When the valve 74 begins to open, air passes into the undrain compartment 28 and rapidly up through the filter media in the filter bed 12. This initiates the gas scouring cycle illustrated in FIGURE 3. The air entering the underdrain compartment 28 and passing up through the filter bed 12 travels at a relatively high velocity. The air agitates the filter bed 12 and causes the foreign particles which have collected therein to become disengaged from the filter media. As the air passes through the filter bed 12, filter media will become entrained in the air. However, by virtue of the present invention, the filter media will disengage from the air when the air enters the air space 21 in the upper part of the filter chamber 18. In this air space 21 the filter media entrained with the scouring air will drop back into the liquid in filter chamber 18. The baffle 32 also assists in disengaging filter media from the scouring air. In this manner, filter media is not carried out of the filter chamber 18 as the scouring air passes through the transfer conduit 30 and the inlet pipe 36 and/or the vent tube 75.

After a predetermined period of time, the timer-valve control mechanism 72 will automatically cause the valve 74 to close and the valve 70 to open. This terminates the gas scouring cycle and initiates backwash cycle. With the vlave 70 open, the filtered liquid in the backwash storage chamber 20 passes through the by-pass conduit 52, the riser pipe 48, the underdrain compartment 28, the filter bed 12, the transfer conduit 30 and the drain pipe 34 to drain as shown in FIGURE 4. This flow of backwash liquid through the filter bed 12 removes the foreign material which accumulated therein during the service cycle.

When the filtered liquid stored in the backwash storage compartment 20 reaches a level below the end of the probe 68 the switch 66 is actuated whereby electrical actuating means 60 closes the valve 62. Once the valve 62 has been closed the service cycle begins and entire operation of the filter apparatus 10 being repeated. During the service cycle, the gas space 21 left after the backwashing cycle is, of course, enlarged by the release of the entrained air carried by the raw liquid. In this manner a gas space 21 is provided of sufficient size so that filter media will disengage from the scouring gas during the next gas scouring cycle.

In those instances where the raw liquid contains suspended matter too small for effective removal by bed-type filtration, a chemical coagulant, which are well known in the art, may be added to the raw liquid upstream of the head box 38 or filter chamber 18. In this manner, the filtering apparatus 10 is rendered capable of handling raw liquid having such finely divided suspended matter therein.

Further more, if the liquid to be treated is water containing iron, manganese and/or sulfide impurities, an oxidizing agent, such as potassium permanganate or the like, may be added to the water prior to its entering the filtering apparatus 10. In such instances, it is desirable to employ a filter bed having a top layer of coarse, low-density materials and a 30-inch lower layer of catalytic mineral material. The coarse, "roughing" top filter layer minimizes the suspended solid load on the lower catalytic mineral material. The catalytic mineral material, with its own oxidizing potential, completes the oxidation of the oxidizable materials in the water and simultaneously filters the precipitates formed. When necessary, a coagulant such as alum is added to insure the complete filterability of the precipitates with minimum leakage. The gas scouring cycle in such instances insures complete removal of the foreign material from the bed, as well as effective scouring of the iron and magnesium coatings on the catalytic mineral material. This insures maximum effectiveness of the filter bed during the next service cycle.

The filtering apparatus 10 may be used to filter water streams, sugar solutions, hydrocarbon streams and the line as will be readily appreciated by one with ordinary skill in the art. The particular filter media employed is a matter of choice, the selection of the filter media being dependent, of course, upon the liquid to be treated and the impurities contained therein. Scouring gases other than air may be employed, such as nitrogen, oxygen and the like, although air is preferred because of lower operating costs. Furthermore, the valves 70, 62 and 74, the switches 66 and 56, the electrical actuating means 60 and the timer-control valve mechanism 72 do not per se constitute a part of the present invention, as there are a myriad of suitable means for performing the functions of these components of the filtering apparatus 10. Accordingly, one with ordinary skill in the art could select suitable valves and control means to operate the filtering apparatus 10 in accordance with the concepts of the present invention described herein.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. A filtering apparatus for removing solid foreign materials from a liquid which comprises means forming an enclosed filter chamber having a filter bed therein, said filter chamber having an inlet side above said filter bed and an outlet side below said filter bed, conduit means having an outlet in said inlet side, said conduit means being adapted to transfer said liquid into said inlet side so that said liquid flows downwardly through said filter bed into said outlet side, means for entraining gas in said liquid prior to said liquid passing into said inlet side through said conduit means, a baffle plate mounted in said inlet side below said outlet of said conduit means to disperse liquid entering said inlet chamber, vent means coacting and communicating with said inlet side below said outlet of said conduit means to define a gas space formed from released entrained gas in said liquid in said inlet side, said vent means controlling the size of said gas space, and means for passing a scouring gas into said outlet side of said filter chamber.

2. The filtering apparatus of claim 1 including means to terminate the flow of said liquid to said inlet side of said filter chamber.

3. A filtering apparatus comprising means forming a filter chamber having a filter bed therein, said filter chamber having an inlet side above said filter bed and an outlet side below said filter bed, a storage tank above said filter chamber, said storage chamber communicating with said outlet side of said filter chamber and receiving effluent from said outlet side of said filter chamber, first pipe means communicating with said inlet side of said filter chamber, means connecting said first pipe means to a source of liquid to be filtered, means for entraining gas in said liquid to be filtered prior to said liquid entering said first pipe means, a service outlet pipe for said effluent communicating with said outlet side of said filter chamber, said service outlet pipe controlling the level of effluent in said storage chamber, said first pipe means being entirely at a level below said service outlet pipe, a vent pipe coacting and communicating with said inlet side of said filter chamber below where said first pipe means communicates with said inlet side to define a gas space formed from released entrained gas in said liquid to be filtered in said inlet side, second pipe means for scouring gas communicating with said outlet side of said filter chamber, means to terminate the flow of liquid to be filtered to said inlet side of said chamber, means for initiating a gas scouring cycle wherein scouring gas passes into said outlet side of said filter chamber upwardly through said filter bed and out said first pipe means, and means for initiating a backwash cycle wherein a portion of said effluent in said storage chamber may flow thorugh said filter chamber and said first pipe means.

4. The filtering apparatus of claim 3 wherein a drain pipe is connected to said first pipe means, said drain pipe having a first valve therein, an outlet riser pipe is connected to said outlet side of said filter chamber and said service outlet pipe, and a by-pass pipe communicating with a lower portion of said storage tank and said riser pipe, said riser pipe having a second valve therein between where said riser pipe communicates with said outlet side and said by-pass pipe.

5. A filter of the self-backwashing type comprising means forming a filter chamber having an upper inlet side and a lower outlet side, said filter chamber having a filter bed between said inlet and outlet sides, a backwash storage compartment above said filter chamber and communicating with the outlet side of said filter chamber, an inlet pipe communicating with said inlet side, means for passing liquid to be treated to said inlet pipe, a backwash outlet pipe communicating with said inlet pipe, means for entraining gas in said liquid prior to said liquid entering said inlet side of said filter chamber, said inlet pipe communicating with said inlet side at a first level, a vent pipe coacting and communicating with said inlet side at a second level which is below said first level and above said filter bed to define a gas space formed from released entrained gas in said liquid in said inlet side, a service outlet communicating with the outlet side of said filter chamber, conduit means for scouring gas communicating with said outlet side, said conduit means having a first valve means therein, means for automatically controlling a gas scouring cycle and a backwash cycle wherein scouring gas and backwash liquid from said backwash storage compartment are passed through said filter bed and said filter chamber from said outlet side to said inlet side, respectively, said control means comprising second valve means in said backwash outlet pipe to control the flow of liquid through said inlet pipe, a high level control pipe means communicating with said inlet side of said filter chamber, a high level sensing switch means associated with said high level control pipe means and electrically connected to said first and second valve means whereby liquid rising to a predetermined height in said high level control pipe means and contacting said high level sensing means causes said first and second valves to open whereby scouring gas passes upwardly through said filter bed and out said inlet pipe, said first valve closing subsequently and liquid from said backwash storage chamber flows to said outlet side, through said filter bed and inlet pipe to said backwash outlet pipe, and a low level sensing switch means disposed within said backwash storage compartment to terminate said backwash cycle, said low level sensing switch means being electrically connected to said second valve means in said backwash outlet pipe.

6. The filter of claim 5 wherein a riser pipe communicates with said outlet side and said service outlet, said riser pipe communicating with a lower portion of said storage compartment through a by-pass pipe, said riser pipe having a third valve means therein which is closed during the gas scouring cycle and open during the backwash cycle.

7. A method of filtering a liquid with a filter bed and cleaning said filter bed which comprises entraining gas in said liquid to be filtered, passing said liquid to be filtered into an enclosed filter chamber containing said filter bed, releasing the entrained gas in said liquid in said filter chamber to form a gas space above said filter bed, passing said liquid downwardly through said filter bed, withdrawing said filtered liquid from said filter chamber and storing a portion of said filtered liquid, terminating the flow of said liquid to be filtered to said filter chamber, passing scouring gas upwardly through said filter bed to clean said filter bed, said scouring gas passing upwardly into said gas space, said gas space providing a zone in which filter media may become disengaged from said scouring gas prior to said scouring gas leaving said filter chamber, withdrawing scouring gas from said filter chamber, and backwashing said filter bed with said stored filtered liquid.

8. The method of claim 7 wherein a portion of said stored filtered liquid is passed upwardly into said filter bed prior to passing scouring gas through said filter bed.

9. A filtering apparatus comprising a tank forming a filter chamber having a filter bed therein, means to transfer liquid to be treated into said filter chamber, said liquid transfer means communicating with said filter chamber above said filter bed, means for entraining gas in said liquid prior to said liquid entering said filter chamber, vent means coacting and communicating with said filter chamber above said filter bed and below where said liquid transfer means communicates with said filter chamber to define a gas space formed from released entrained gas in said liquid above said filter bed in said filter chamber, said vent means controlling the size of said gas space, and means for passing a scouring gas into said filter chamber below said filter bed.

10. A filtering apparatus comprising a tank forming a filter chamber, having a filter bed therein, said tank including a roof, sidewall and bottom, means to transfer liquid to be treated into said filter chamber, said liquid transfer means communicating with said filter chamber above said filter bed, means for entraining gas in said liquid prior to said liquid entering said filter chamber, vent means attached to said sidewall and coacting and communicating with said filter chamber above said filter bed and below where said liquid transfer feed means communicates with said filter chamber to define a gas space formed from released entrained gas in said liquid above said filter bed in said filter chamber, said vent means controlling the size of said gas space, and means for passing a scouring gas into said filter chamber below said filter bed.

11. A method of filtering a liquid and cleaning the filter which comprises entraining gas in said liquid, passing said liquid with said entrained gas into an enclosed filter chamber having a filter betd therein, releasing entrained gas from said liquid to form a gas space in said filter chamber above said filter bed, passing said liquid downwardly through said filter bed in said filter chamber, withdrawing treated liquid from said filter chamber, terminating the flow of said liquid with entrained gas to said filter chamber, passing a scouring gas upwardly through said filter bed and into said gas space, and withdrawing scouring gas from said filter chamber.

12. The method of claim 11 wherein filter media entrained in said scouring gas is released in said gas space prior to said scouring gas leaving said filter chamber.

13. The method of claim 12 wherein a small amount of treated liquid is passed upwardly through said bed prior to passing scouring gas therethrough.

14. The method of claim 11 wherein said filter bed is backwashed with treated liquid after passing scouring gas through said filter bed.

References Cited by the Examiner

UNITED STATES PATENTS

| | | | |
|---|---|---|---|
| 309,222 | 12/1884 | Gray | 210—274 |
| 317,457 | 5/1885 | Hodgkin et al. | 210—274 |
| 614,594 | 11/1898 | Williamson | 210—274 |
| 625,508 | 5/1899 | Hyatt | 210—80 |
| 625,556 | 5/1899 | Hyatt | 210—277 |
| 630,988 | 8/1899 | Reisert | 210—108 |
| 656,043 | 8/1900 | Paterson | 210—108 |
| 1,769,475 | 7/1930 | Teitsworth | 210—80 |
| 2,046,770 | 7/1936 | Coberly et al. | 210—108 |
| 2,423,172 | 7/1947 | Booth | 210—82 |
| 2,879,891 | 3/1959 | Beohner et al. | 210—80 |
| 3,111,486 | 11/1963 | Soriente | 210—108 |
| 3,193,099 | 7/1965 | Soriente et al. | 210—108 X |

REUBEN FRIEDMAN, *Primary Examiner.*

ROBERT F. BURNETT, *Examiner.*

D. M. RIESS, D. TALBERT, *Assistant Examiners.*